(12) United States Patent
Wild et al.

(10) Patent No.: US 7,262,239 B2
(45) Date of Patent: Aug. 28, 2007

(54) INTERNAL SOFTENING ADDITIVES FOR POLYOLEFIN-CONTAINING MATERIALS AND METHODS OF USING THE SAME

(75) Inventors: Christine Wild, Hilden (DE); Paul Birnbrich, Solingen (DE); Raymond Mathis, Duesseldorf (DE)

(73) Assignee: Cognis Deutschland GmbH & Co. KG, Duesseldorf (DE)

( * ) Notice: Subject to any disclaimer, the term of this patent is extended or adjusted under 35 U.S.C. 154(b) by 0 days.

(21) Appl. No.: 10/504,798

(22) PCT Filed: Feb. 5, 2003

(86) PCT No.: PCT/EP03/01096

§ 371 (c)(1),
(2), (4) Date: Mar. 8, 2005

(87) PCT Pub. No.: WO03/068856

PCT Pub. Date: Aug. 21, 2003

(65) Prior Publication Data

US 2005/0171261 A1    Aug. 4, 2005

(30) Foreign Application Priority Data

Feb. 13, 2002  (DE)  .............. 102 06 111

(51) Int. Cl.
  *D04H 1/42*   (2006.01)
  *C08G 65/08*  (2006.01)
  *C08G 65/33*  (2006.01)
  *C08L 101/00* (2006.01)
  *C08L 71/02*  (2006.01)
  *C08L 23/02*  (2006.01)

(52) U.S. Cl. ............ 524/322; 524/375; 524/306; 524/318; 524/320; 524/321; 428/393; 428/375; 560/1; 560/129

(58) Field of Classification Search ........ 524/306; 428/375, 393; 560/129
See application file for complete search history.

(56) References Cited

U.S. PATENT DOCUMENTS

| | | | |
|---|---|---|---|
| 3,957,712 A * | 5/1976 | Heyden et al. ........ 524/308 |
| 4,873,271 A | 10/1989 | Lundy et al. |
| 5,030,280 A | 7/1991 | Hoefer et al. |
| 5,118,324 A | 6/1992 | Uchida |
| 5,439,734 A * | 8/1995 | Everhart et al. ........ 442/400 |
| 6,699,922 B2 * | 3/2004 | Birnbrich et al. ....... 524/284 |
| 2004/0138360 A1 * | 7/2004 | Wild et al. .............. 524/336 |

FOREIGN PATENT DOCUMENTS

| | | | |
|---|---|---|---|
| DE | 1 296 803 B | | 6/1969 |
| DE | 101 23 863 A1 | | 11/2002 |
| EP | 0 073 479 A1 | | 3/1983 |
| EP | 1 138 810 A1 | | 10/2001 |
| GB | 1018262 A | * | 10/1962 |
| GB | 1018262 A | | 1/1966 |
| GB | 1018262 A | * | 1/1966 |
| JP | 61-123652 A | | 6/1986 |
| WO | WO-95/10648 | * | 4/1995 |
| WO | WO95/10648 A1 | | 4/1995 |
| WO | WO 01/75199 A1 | | 10/2001 |
| WO | WO 02/092891 A1 | | 11/2002 |

* cited by examiner

*Primary Examiner*—Duane Smith
*Assistant Examiner*—Ives Wu
(74) *Attorney, Agent, or Firm*—John F. Daniels; Jane E. Keene

(57) ABSTRACT

Methods for imparting softness to polyolefin-containing articles are described wherein the methods comprise: (a) providing at least one compound selected from the group consisting of compounds of the general formula (I) and compounds of the general formula (II):

A-B-C-B-A   (I)

A-B-Acyl    (II)

wherein each A independently represents a R—C(O)O— group wherein R represents an alkyl group having from 7 to 21 carbon atoms; each B independently represents a —$(C_nH_{2n}O)_k$— group wherein n represents a number of from 2 to 4 and k represents a number of from 1 to 15; and C represents an alkylene group having from 2 to 6 carbon atoms; (b) combining the at least one compound and a polyolefin-containing material to form a mixture; and (c) subjecting the mixture to further processing to form an article.

16 Claims, No Drawings

INTERNAL SOFTENING ADDITIVES FOR POLYOLEFIN-CONTAINING MATERIALS AND METHODS OF USING THE SAME

BACKGROUND OF THE INVENTION

In many cases, the surface of plastic products has to be provided with special effects which either can only be produced incompletely, if at all, during molding/shaping for technical reasons or can only be produced unfavorably for economic reasons. One such effect is, for example, improving the softness of the products, particularly in the case of articles which come into direct contact with the human skin.

In the production of hygiene articles, such as diapers or sanitary napkins, and also wiping cloths or "geofleeces", absorbent materials are used to take up aqueous liquids. In order to prevent direct contact with the absorbent material during wear and to increase wearing comfort, this material is enveloped in a thin water-permeable nonwoven. Such nonwovens are normally made from synthetic fibers, such as polyolefin or polyester fibers, because these fibers can be inexpensively produced, show good mechanical properties and are heat-resistant. With this application in mind, it is also desirable to be able to produce nonwovens with high levels of softness.

Additives of the type in question are generally processed with polyolefin granules to form a masterbatch which is then added as such to the polymer granules before processing to the fibers or other end products, followed by extrusion. However, it is desirable for reasons of cost to be able to incorporate such additives during the actual extrusion process in the extruder.

Accordingly, the problem addressed by the present invention was to provide additives for improving the softness of polyolefin fibers or articles containing such fibers.

BRIEF SUMMARY OF THE INVENTION

The present invention relates, in general, to additives for hydrophilicizing polyolefin-containing materials, preferably polypropylene fibers.

The present invention relates firstly to the use of compounds corresponding to general formula (I) or (II):

$$A\text{-}B\text{-}C\text{-}B\text{-}A \quad (I)$$

$$A\text{-}B\text{-}Acyl \quad (II)$$

for the softening finishing of polyolefin-containing articles. In these formulae, A is a group R—COO, where R is a saturated, branched or unbranched $C_{7\text{-}21}$ alkyl group, B represents a group $(C_nH_{2n}O)_k$ in which n is an integer of 2 to 4 and k has a value of 1 to 15, and C in formula (I) is a linear or branched alkylene group containing at least 2 and at most 6 carbon atoms. The index k relates to the individual group B and does not indicate the total number of groups B in the molecule. The index k varies on account of the varying, technically related degrees of alkoxylation of the individual molecules and, accordingly, may also be an odd number.

DETAILED DESCRIPTION OF THE INVENTION

The compounds corresponding to general formula (I) are obtained, for example, by reaction of polyalkylene glycols with alkoxides and with saturated fatty acids. On the one hand, diols containing 2 to 6 carbon atoms, which form structural unit C of the additives according to the invention, and ethylene, propylene and/or butylene oxide which form the groups B in the compounds according to the invention must be present. The free hydroxyl groups of the alkoxides are terminated by saturated $C_{8\text{-}22}$ fatty acids. Compounds such as these and their production are known from applicants' DE 10123863.0.

The diols are preferably selected from the group consisting of ethane-1,2-diol, propane-1,2-diol, propane-1,3-diol and butane-1,4-diol. In principle, mixtures of the diols may also be used although it has proved to be of advantage to use only one diol for the reaction.

The alkoxides are selected from the group consisting of ethylene oxide, propylene oxide and butylene oxide and mixtures thereof. If alkoxides of different types are reacted, the alkoxylation reaction may be carried out both blockwise and at random. The number of alkoxide units in the compounds of formula (I) varies from 2 to 30 so that k may assume a value of 1 to 15. Preferred compounds of formula (I) are those in which k has a value of 2 to 15, preferably 4 to 10 and more particularly 10. Other preferred compounds of formula (I) contain ethylene oxide units as the group B, preferably only ethylene oxide units.

Suitable saturated fatty acids which can form group A of the compounds according to the invention are preferably selected from the group consisting of octanoic acid, nonanoic acid, decanoic acid, undecanoic acid, dodecanoic aid, tridecanoic acid, tetradecanoic acid, pentadecanoic acid, hexadecanoic acid, heptadecanoic acid and octadecanoic acid; nonadecanoic acid, eicosanoic acid and heneicosanoic acid; and docosanoic acid. Compounds corresponding to formula (I), in which R is a saturated $C_{9\text{-}13}$ or $C_{9\text{-}11}$ alkyl group, are preferred. Compounds corresponding to formula (I) based on decanoic acid ($C_{10}$) and undecanoic acid ($C_{11}$) are most particularly preferred.

Preferred compounds of formula (I) have a cold cloud point below 12° C., preferably below 10° C. and more particularly below 6° C. It is of particular advantage to use compounds of formula (I) which have a cold cloud point below 5° C. and more particularly below 3° C.

Preferred compounds of formula (I) suitable as additives in accordance with the invention are those in which R is a linear alkyl group containing 9 carbon atoms, k has a value of 5, n has a value of 2 and C is a group $CH_2$—$CH(CH_3)$ or in which R is a linear alkyl group containing 11 carbon atoms, k has a value of 5, n has a value of 2 and C is a group $CH_2$—$CH_2(CH_3)$.

The additives according to the invention may be used on their own or in admixture with one another. In addition, other additives known from the prior art for the extrusion or production of polymers may be added.

Besides the additives of formula (I), additives of formula (II) may also be used. These compounds (II) are obtained by reacting two parts $C_{8\text{-}22}$ and preferably $C_{10\text{-}12}$ fatty acid with one part polyethylene glycol. Polyethylene glycols with a molecular weight of 300 to 600 and preferably with a molecular weight of 400 are preferably reacted with fatty acids or fatty acid derivatives by methods known per se, preferably in the presence of catalysts. Saturated $C_{10\text{-}12}$ fatty acids are particularly preferred. Suitable fatty acid derivatives are methyl esters of $C_{10\text{-}12}$ fatty acids. The alcohol and acid components are reacted in a molar ratio of ca. 1:2. The use of reaction products of polyethylene glycol, molecular weight 400, with decanoic or lauric acid is particularly preferred. Mixtures of the acids may also be reacted with the polyethylene glycol. The compounds of formula (II) are the subject of International patent application WO 01/175199.

This document also discloses the use of compounds of formula (II) for hydrophilicizing polyolefin-containing fibers but does not suggest that the additives are also suitable for softening finishes.

According to the invention, the additives are used in polyolefin-containing materials, preferably fibers, sheet-form materials, such as nonwovens and films, for improving softness.

Suitable polyolefin-containing materials are any known polymers and copolymers based on ethylene or propylene. Mixtures of pure polyolefins with copolymers are also suitable in principle. The additives may also be used in mixtures of polyolefins with other synthetic or natural polymers, for example cellulose or hemp, in order to provide the polyolefin fibers with greater softness.

Polymers particularly suitable for the purposes of the teaching according to the invention are listed below: poly (ethylenes), such as HDPE (high-density polyethylene), LDPE (low-density polyethylene), VLDPE (very-low-density polyethylene), LLDPE (linear low-density polyethylene), MDPE (medium-density polyethylene), UHMPE (ultra high molecular polyethylene), VPE (crosslinked polyethylene), HPPE (high-pressure polyethylene); poly(propylenes), such as isotactic polypropylene; syndiotactic polypropylene; Metallocen-catalyzed polypropylene PP, high-impact polypropylene, random copolymers based on ethylene and propylene, block copolymers based on ethylene and propylene; EPM (poly[ethylene-co-propylene]); EPDM (poly[ethylene-co-propylene-co-unconjugated diene]).

Other suitable polymers are: poly(styrene); poly(methylstyrene); poly(oxymethylene); Metallocen-catalyzed α-olefin or cycloolefin copolymers, such as norbornene/ethylene copolymers; copolymers containing at least 60% ethylene and/or styrene and less than 40% monomers, such as vinyl acetate, acrylates, methacrylates, acrylic acid, acrylonitrile, vinyl chloride. Examples of such polymers are: poly(ethylene-co-ethyl acrylate), poly(ethylene-co-vinyl acetate), poly (ethylene-co-vinyl chloride), poly(styrene-co-acrylonitrile). Also suitable are graft copolymers and polymer blends, i.e. mixtures of polymers in which the above-mentioned polymers inter alia are present, for example polymer blends based on polyethylene and polypropylene.

The additives according to the invention are also suitable for the softening of so-called "bico" fibers (core-sheath fibers) produced from PES/PE or PP/PE.

Homopolymers and copolymers based on ethylene and propylene are particularly preferred for the purposes of the present invention. In one embodiment of the present invention, therefore, polyethylene on its own is used as the polyolefin; in another embodiment, polypropylene on its own is used as the polyolefin and, in a further embodiment, ethylene/propylene copolymers are used as the polyolefin.

In one particularly preferred embodiment of the invention, the additives are used in polypropylene fibers. Such fibers preferably have a melt flow rate of greater than 10 to 1,500 dg/min. (as measured at 230° C./2.16 kg load). Preferred fibers can have melt flow rates of, for example, 150 to 1,200 or 20 to 25 or 400 to 1,000 dg/min.

The present invention also relates to a process for the softening finishing of articles completely or partly containing polyolefins, in which compounds corresponding to formula (I) and/or (II) are added to polymer granules completely or partly containing polyolefins in quantities of 0.1 to 5% by weight, based on the granules, followed by processing in known manner to fibers or films, preferably by extrusion.

The articles, preferably fibers or films or sheet-form materials, such as nonwovens, of these fibers contain the additives in quantities of preferably 0.1 to 10% by weight, more preferably 0.1 to 2.0% by weight and most preferably 0.1 to 1.8% by weight, based on the total weight of the articles. The quantities are partly well below the concentrations known to achieve a hydrophilic effect. The use of compounds of formulae (I) and/or (II) in accordance with the invention as internal additives leads to polyolefin-containing products with high softness levels. In principle, fibers finished with the additives according to the invention may of course also be subjected to an external softening treatment. It is an advantage in this regard that the quantity of finish used for this additional external treatment can be kept distinctly smaller than would be the case without internal softening.

EXAMPLE

The softening effect of the additives according to the invention was tested as follows: Two PP spunbonded nonwovens were produced—one with an additive according to the invention (1.8% by weight) corresponding to formula (I) and one without this additive. The softness of the nonwovens was then determined by a feel test. The possible feel scores ranged from 1=very soft to 4=hard. Whereas the additive-free nonwoven achieved a score of 3-4, the nonwoven according to the invention was awarded a score of 2.

The invention claimed is:

1. A method comprising:
 (a) providing at least one compound selected from the group consisting of compounds of the general formula (I) and optionally compounds of the general formula (II):

A-B-C-B-A  (I)

A-B-Acyl  (II)

wherein each A independently represents a R—C(O)O— group, wherein in formula I R represents a linear alkyl group having 9 carbon atoms and each B independently represents a —(C$_2$H$_4$O)$_5$— group, and wherein in formula II R represents an alkyl group having from 7 to 21 carbon atoms and each B represents a —(C$_n$H$_{2n}$O)$_k$— group wherein n represents a number of from 2 to 4 and k represents a number of from 1 to 15; and C represents a —CH$_2$—CH(CH$_3$— group;
 (b) combining the at least one compound and a polyolefin-containing material to form a mixture; and
 (c) subjecting the mixture to further processing to form an article.

2. The method according to claim 1, wherein the general formula (I) has a cold cloud point below 12° C.

3. The method according to claim 1, wherein at least one compound of the general formula (II) is provided and prepared by reacting two parts C$_{8-22}$ fatty acid and one part polyethylene glycol.

4. The method according to claim 1, wherein the at least one compound of the general formula (II) is provided and prepared by reacting two parts C$_{10-12}$ fatty acid and one part polyethylene glycol.

5. The method according to claim 1, further comprising providing the article with an external finish.

6. The method according to claim 1, wherein at least one compound of the general formula (I) and at least one compound of the general formula (II) are combined with the polyolefin-containing material.

7. An internally hydrophilicized polyolefin article comprising an extruded mixture of a polyolefin-containing material and an internal additive, wherein the Internal additive comprises at least one compound selected from the group consisting of compounds of the general formula (I) and optionally compounds of the general formula (II):

A-B-C-B-A   (I)

A-B-Acyl   (II)

wherein each A independently represents a R—C(O)O— group wherein in formula I R represents a linear alkyl group having 9 or 11 carbon atoms and each B independently represents a —$(C_2H_4O)_5$— group, and wherein in formula II R represents an alkyl group having from 7 to 21 carbon atoms and each B represents a —$(C_nH_{2n}O)_k$— group, wherein n represents a number of from 2 to 4 and k represents a number of from 1 to 15; and C represents a —$CH_2$—$CH(CH_3)$— group.

8. A method comprising:
(a) providing at least one compound selected from the group consisting of compounds of the general formula (I) and optionally compounds of the general formula (II):

A-B-C-B-A   (I)

A-B-Acyl   (II)

wherein each A independently represents a R—C(O)O— group, wherein in formula I R represents a linear alkyl group having 11 carbon atoms and each B independently represents a —$(C_2H_4O)_5$— group, and wherein in formula II R represents an alkyl group having from 7 to 21 carbon atoms and B represents a —$(C_nH_{2n}O)_k$— group wherein n represents a number of from 2 to 4 and k represents a number of from 1 to 15; and C represents a —$CH_2$—$CH(CH_3)$— group;
(b) combining the at least one compound and a polyolefin-containing material to form a mixture; and
(c) subjecting the mixture to further processing to form an article.

9. The method according to claim 1, wherein the polyolefin-containing material is provided in granular form.

10. The method according to claim 9, wherein the step of subjecting the mixture to further processing comprises extrusion.

11. The method according to claim 8, wherein the polyolefin-containing material is provided in granular form.

12. The method according to claim 11, wherein the step of subjecting the mixture to further processing comprises extrusion.

13. The method according to claim 8, further comprising providing the article with an external finish.

14. The method according to claim 8, wherein at least one compound of the general formula (I) and at least one compound of the general formula (II) are combined with the polyolefin-containing material.

15. The method according to claim 8, wherein at least one compound of the general formula (II) is provided and prepared by reacting two parts $C_{8-22}$ fatty acid and one part polyethylene glycol.

16. The method according to claim 8, wherein at least one compound of the general formula (II) is provided and prepared by reacting two parts $C_{10-12}$ fatty acid and one part polyethylene glycol.

* * * * *